United States Patent [19]

Evertz et al.

[11] 4,405,383
[45] Sep. 20, 1983

[54] METHOD AND APPARATUS FOR A SURFACE STRIPPING TREATMENT OF OBJECTS CONSISTING OF IRON WITH A HIGH CARBON CONTENT

[75] Inventors: Egon Evertz, Solingen; Helmut Rahn, Dortmund, both of Fed. Rep. of Germany

[73] Assignee: Evon Evertz, Solingen, Fed. Rep. of Germany

[21] Appl. No.: 327,745

[22] Filed: Dec. 4, 1981

[30] Foreign Application Priority Data

Dec. 15, 1980 [DE] Fed. Rep. of Germany ....... 3047158

[51] Int. Cl.³ .............................................. B23K 7/06
[52] U.S. Cl. ........................................ 148/9.5; 266/51
[58] Field of Search ........................... 148/9.5; 266/51

[56] References Cited

U.S. PATENT DOCUMENTS

| | | | |
|---|---|---|---|
| 2,664,368 | 12/1953 | Babcock et al. | 148/9.5 |
| 2,674,210 | 4/1954 | Holub et al. | 148/9.5 |
| 3,455,747 | 7/1969 | Lytle | 148/9.5 |

Primary Examiner—W. Stallard
Attorney, Agent, or Firm—Holman & Stern

[57] ABSTRACT

The invention relates to the surface stripping treatment of objects consisting of iron with a high carbon content, the surface stripping treatment being carried out by means of a flame which is directed at the surface and which is formed by the combustion of a heating gas with oxygen, there being also provided in the impingement zone of the flame a gas which flows at a slower velocity than the heating gas and the oxygen and which also reacts endothermically with at least one component of the flame gases.

12 Claims, 4 Drawing Figures

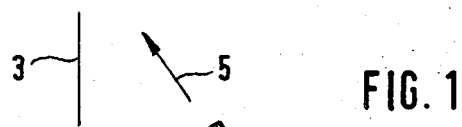
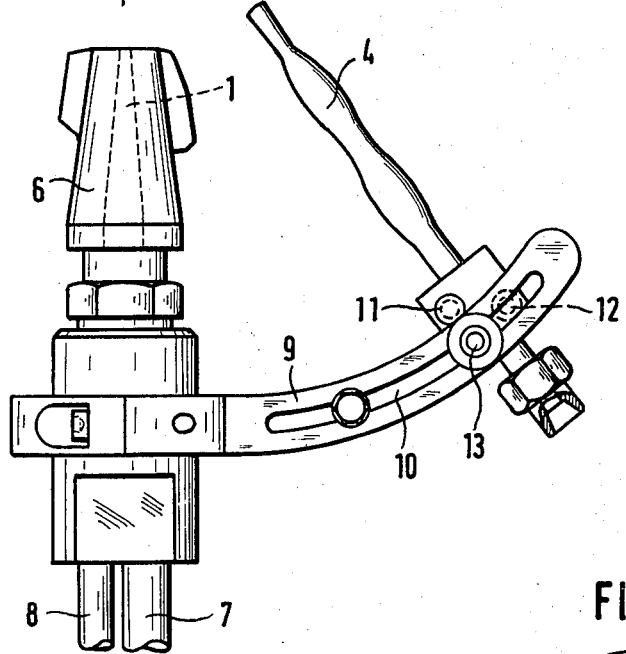
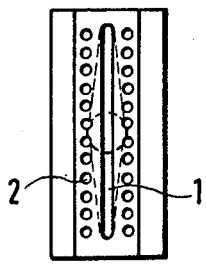
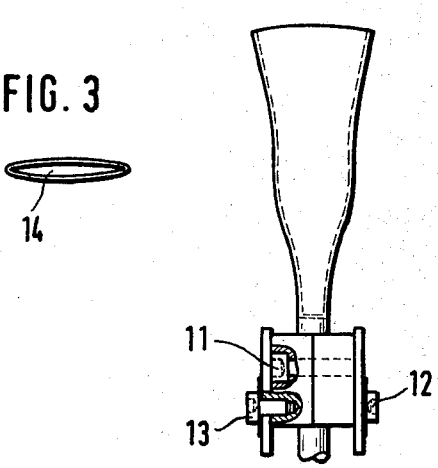

METHOD AND APPARATUS FOR A SURFACE STRIPPING TREATMENT OF OBJECTS CONSISTING OF IRON WITH A HIGH CARBON CONTENT

This invention relates to a method for a surface stripping treatment of objects concisting of iron with a high carbon content, such as cast iron, spheroidal graphite iron and pig iron. The invention also relates to a burner for carrying out said method.

A method of this kind is disclosed in German PS 19 37 089. According to this known method the surface of objects which consist of high carbon-content iron, particularly spheroidal graphite iron, is heated at one point thereof to melting temperature by means of a gas/oxygen flame and subsequently the material is removed by means of a gas jet consisting essentially of oxygen. However, in the course of this treatment a considerable amount of brown smoke is developed due to oxidation of the iron so that the immediate place of work and its wider environment are liable to a considerable degree of pollution.

On the other hand, it is known to apply a surface stripping treatment to objects consisting of steel by applying a process known as "flame-stripping"; however, this requires a considerable degree of preheating of the material which is not only expensive but in fact not practicable to the desired degree of uniformity in the case of hollow bodies and complex geometrical shapes, and may even entail the risk of tension-cracking in the material. Moreover, steel and high carbon-content iron such as cast iron, are fundamentally different materials in respect of their greatly differing melting and boiling points, both of which are of critical importance particularly in regard to the formation of iron vapours and brown smoke. There is also a great difference in their thermal conductivity properties so that all in all treatment which can be successfully applied to one of these materials cannot be used on the other.

It is one object of the present invention to provide an improved method which, inter alia, will reduce the generation of objectionable brown smoke.

In accordance with one aspect of the invention, there is provided a method for a surface stripping treatment of objects consisting of iron with a high carbon content such as cast iron, spheroidal graphite iron and pig iron wherein a flame which is formed by combustion of a heating gas with oxygen is directed at the surface which is to be stripped, the flame producing a molten pool of metal at the point of flame impingement and being conducted linearly across the entire surface for linear localised propagation of the melt and its removal, characterised in that in the impingement zone of the flame jet a gas which flows at a slower velocity than the heating gas and the oxygen and which reacts endothermically with at least one component of the flame gases and thereby absorbs heat, is also applied to the surface of the object.

In accordance with another aspect of the invention, there is provided a burner for carrying out a method as defined in the preceding paragraph, characterised in that said burner comprises a nozzle having an approximately rectangular section central oxygen-delivery orifice, a row of small heating gas-delivery orifices on each of the longitudinal sides of said oxygen-delivery orifice and a further nozzle of flattened cross-section which is angularly adjustable relative to the first-mentioned nozzle.

For the purpose of the invention it is essential, first of all, that the right chemical conditions are created for a suppression of brown smoke and, secondly, that flow technique provisions are applied which in conjunction with the chemical conditions achieve a solution to the specific problem addressed by this invention. The endothermically reacting gas according to the present invention, which flows at a slower velocity than the heating gas and the oxygen, has, due to its slower flow velocity, a sufficiently long period of dwell to achieve a satisfactory degree of endothermic reaction, thereby reducing the temperature of the melt which has been formed to such an extent that the development of brown smoke is very greatly reduced. Thus it is possible, due to the reaction of the endothermically reacting gas with the flame gases, to arrive at a heat-consuming regeneration of already burnt gases which strongly reduces brown smoke development.

However, it is vital in this context, in constrast with the instructions given in German Patent Specification 19 37 089, that not only oxygen but also a heating gas supply are maintained and a flame is formed throughout the entire duration of the process.

On the other hand, it is quite adequate if the endothermically reacting gas is applied only after the initial formation of the melt. This has the advantage that there is no effective loss of performance due to a reduced heat supply in the initial phase of the process.

The endothermically reacting gas may either be formed by combustion of a portion of the heating gases, or it may be fed to the spot of flame impingement separately from the flame jet. It may also be delivered into the flame itself.

In one embodiment of the invention, in which the oxygen is fed centrally and the oxygen supply jet is enveloped by the supply of heating gas, the flame is produced by a hydrocarbon gas and oxygen at an approximately stoichiometrical combustion ratio whereas the endothermically reacting gas is fed separately.

An example of particular interest is the addition by way of endothermically reacting gas, of a jet of carbon dioxide at the rate of 0.5 vol.% to 2.0 vol.% relative to the amount of oxygen supply and at a flow velocity which is from 1.2 to 3.0% of that of the oxygen jet. At this flow rate and in this quantity ratio the endothermically reacting gas fed separately from the flame virtually does not impair the stripping performance at all whilst satisfactorily suppressing brown smoke development. The melt which is produced by the flame is forced out of the melting zone by the kinetic energy of the gas jet so that the desired surface stripping effect is achieved.

Particularly when considered from the view point of an adequate heat supply and sufficient kinetic energy to achieve the removal of the molten material, the application, simultaneously with that of the above described carbon dioxide jet, of oxygen is recommended in the form of an oxygen jet discharged at a flow velocity which is within the range of about 1.2 to 4 times greater than that of the heating gas flow. The gas jets which at such relative flow velocities are delivered to the surface region which is to be stripped must however have a minimum flow velocity and this will be chosen such that in the case of the oxygen jet it shall not fall below 100 m/sec. whilst the upper flow velocity limit of the oxygen jet should be about 300 m/sec. The velocity of the jet of heating gas can then be calculated on the basis of the above-mentioned relation formula.

In another embodiment of the invention the endothermically reacting gas is formed by a reaction in the heating gas flame itself, the total oxygen supply here being about 1.1 to 1.3 times higher than the stoichiometric combustion ratio, the heating gas again being a hydrocarbon gas and the flame core being directed at the surface of the object with an approximately circular jet of oxygen representing the above-mentioned excess ratio. In other words, the endothermic reaction occurs in a zone which is enveloped and sheathed by the flame and this in any case prevents the development and spread of brown smoke, provided that the above-mentioned excess oxygen ratio is maintained. On the other hand, below said ratio, whilst brown smoke development is still suppressed, the surface stripping performance is significantly impaired.

The velocity ratio of heating gas and oxygen jet on the one hand and the jet of endothermically reacting gas on the other is also critical for the above described method, best results being obtained if the oxygen jet is delivered to the surface at a velocity which is from 1.5 to 2 times greater than that of the jet of heating gas.

Specifically as applied to the surface stripping of cast iron, spheroidal graphite iron and steely pig iron, the available amount of heat related to the time unit corresponds to a delivery of about 500 l/min propane gas (which forms the heating gas), burnt with oxygen delivered at the rate of about 2500 l/min to 3300 l/min. With an available heat supply of this order of magnitude it is possible, on the one hand, to melt in each case a sufficiently large quantity of the cast iron material and to strip or evacuate this molten material by the kinetic energy of the flame whilst on the other hand brown smoke development can be satisfactorily suppressed.

One example of a burner for carrying out a method in accordance with the invention is shown in the accompanying drawings in which FIG. 1 is an overall view of the burner, FIG. 2 is an end view of one nozzle, namely the heating nozzle, of the burner seen in FIG. 1, whilst FIG. 3 is an end view and FIG. 4 is a lateral view of another nozzle of the burner seen in FIG. 1.

As shown in FIGS. 1 and 2, the burner head 6 comprises an outlet orifice 1 for oxygen which is of narrow rectangular shape in cross-section together with gas outlet orifices 2 which are arranged in two rows of 12 individual jets on the two longitudinal sides of the rectangular orifice 1. Oxygen supply is through a connection 7 whilst the heating gas such as propane is fed through a connection 8 which has a smaller cross-section. Thus the flame-spread is essentially confined to a plane 3 situated in front of the nozzle 6 which during operation is aimed at an object which is to be superficially stripped. The flame produces a molten pool of metal at the point of flame impingement and is conducted linearly across the entire surface for linear localised propagation of the melt and its removal.

Extending laterally from the burner head 6 is an arcuate guide 9 with an arcuate slot 10 in which a further nozzle 4 (through which a gas, such as carbon dioxide which reacts endothermically with at least one portion of the flame gases passing through nozzle 6, is passed) is adjustable by means of guide rollers 11, 12 and a set screw 13. The nozzle 4 is of generally flattened configuration and has an outlet which is of elliptical form in cross-section, as seen in FIG. 3, the axis ratio being about 1:10. Thus the jet of, say, carbon dioxide, which issues from the nozzle 4 in the direction of arrow 5 intersects the plane 3 which contains the flame at a place which depends on the given setting or angular adjustment of the nozzle 4. Angular adjustment can therefore be made within wide limits and adapted to flame spread. The carbon dioxide gas reacts endothermically with at least one component of the flame gases so as thereby to absorb heat but it is conveniently applied to the flame impingement zone only after initial melting of the surface being stripped has been accomplished.

In one convenient example, the outlet cross-section of the central oxygen delivery orifice 1 has an area of 2.85 $cm^2$ and the total cross-sectional area of all the outlet orifices 2 for the heating gas, which takes the form of propane, amounts to 1.18 $cm^2$. The elliptical cross-section outlet of the nozzle 4 has an area of 1.50 $cm^2$.

Alternatively, a nozzle 6 may be used which has a circular central oxygen delivery orifice area of 1.86 $cm^2$ concentrically surrounded by a ring of 14 small propane delivery orifices with a total cross-sectional area of 0.53 $cm^2$, the central circular orifice being used to deliver a total oxygen supply which is from about 1.1 to about 1.3 times the stoichiometric combustion ratio. The oxygen jet may be directed at the surface being stripped at a flow velocity which is from 1.1 to 2 times greater than that of the heating gas jet.

Operational results are summed up below for the following operative parameters:

Form of burner
(1) nozzle 6 having circular central oxygen delivery orifice, concentrically surrounded by a ring of small propane delivery orifices.
(2) nozzle 6 of rectangular form in cross-section for delivery of oxygen and propane together with a flattened nozzle 4 for delivery of carbon dioxide.

Operative parameters
(a) using oxygen at a pressure of 14 bar and propane at a pressure of 1.5 bar
(b) using oxygen at a pressure of 12 bar and propane at a pressure of 1.5 bar
(c) using oxygen at a pressure of 14 bar and propane at a pressure of 1.5 bar and carbon dioxide at a pressure of 6 to 8 bar
(d) using oxygen at a pressure of 10 bar and propane at a pressure of 1.5 bar

|     | (a) | (b) | Results: (c) | (d) |
| --- | --- | --- | --- | --- |
| (1) | heavy smoke | less smoke | — | significant smoke reduction, lower output performance |
| (2) | heavy smoke | less smoke, very poor output performance | Useful performance, much reduced smoke emission | unacceptably poor performance, greatly reduced smoke emission |

We claim:
1. A method for a surface-stripping treatment of objects consisting of iron with a high carbon content such as cast iron, spheroidal graphite iron and pig iron wherein a flame which is formed by combustion of a heating gas with oxygen is directed at the surface which is to be stripped, the flame producing a molten pool of metal at the point of flame impingement and being conducted linearly across the entire surface for linear localised propagation of the melt and its removal, characterised in that in the impingement zone of the flame jet a gas which flows at a slower velocity than the heating gas and the oxygen and which reacts endothermically with at least one component of the flame gases and thereby absorbs heat, is also applied to the surface of the object.

2. A method according to claim 1, characterised in that the endothermically reacting gas is applied to the flame impingement zone only after melting of the surface material in this zone.

3. A method according to claim 1, characterised in that the endothermically reacting gas is formed by the combustion of at least one portion of the heating gas.

4. A method according to claim 1, characterised in that the endothermically reacting gas is delivered to the flame impingement zone separately from the flame.

5. A method according to claim 1, characterised in that the endothermically reacting gas is fed into the flame.

6. A method according in claim 1, characterised in that the oxygen is fed centrally and the heating gas is fed in such a way as to envelop the jet of oxygen.

7. A method according to claim 1, characterised in that the flame is formed from a hydrocarbon gas and oxygen at an approximately stoichiometric combustion ratio.

8. A method according to claim 7, characterised in that the endothermically reacting gas is provided in the form of a jet of carbon dioxide applied at the rate of 0.5 vol.% to 2.0 vol.% relative to the amount of oxygen and at a flow velocity of 1.2% to 3.0% relative to that of the oxygen jet, and in that it is delivered separately from the flame jet.

9. A method according to claim 1, characterised in that the oxygen jet is directed at the surface at a velocity which is about 1.2 to 4 times greater than that of the heating gas flow velocity, the velocity of the oxygen jet being between 100 and 300 m/sec.

10. A method according to claim 1, characterised in that the endothermically reacting gas is obtained by a reaction in the flame of the heating gas due to the application of a total oxygen supply which is from about 1.1 to about 1.3 times higher than the stoichiometric combustion ratio, the heating gas being a hydrocarbon gas and the flame core being directed at the surface with an approximately circular excess-laden oxygen jet.

11. A method according to claim 10, characterised in that the oxygen jet is directed at the surface at a flow velocity which is from 1.1 to 2 times greater than that of the heating gas jet.

12. A method according to claim 1, characterised in that the flame which is directed at the surface to be removed is formed by the combustion of about 500 l/min propane with about 2500 l/min to 3300 l/min oxygen.

* * * * *